(12) United States Patent
Arima (10) Patent No.: US 10,953,837 B2
(45) Date of Patent: Mar. 23, 2021

(54) AIRBAG APPARATUS

(71) Applicant: HONDA MOTOR CO., LTD., Tokyo (JP)

(72) Inventor: Tetsuhiro Arima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 32 days.

(21) Appl. No.: 16/152,542

(22) Filed: Oct. 5, 2018

(65) Prior Publication Data
US 2019/0118758 A1 Apr. 25, 2019

(30) Foreign Application Priority Data
Oct. 20, 2017 (JP) .............................. JP2017-203546

(51) Int. Cl.
| B60R 21/233 | (2006.01) |
|---|---|
| B60R 21/205 | (2011.01) |
| B60R 21/264 | (2006.01) |
| B60R 21/00 | (2006.01) |

(52) U.S. Cl.
CPC .......... *B60R 21/233* (2013.01); *B60R 21/205* (2013.01); *B60R 21/264* (2013.01); *B60R 2021/006* (2013.01); *B60R 2021/23324* (2013.01)

(58) Field of Classification Search
CPC ................ B60R 21/205; B60R 21/233; B60R 2021/006; B60R 2021/162; B60R 2021/23308; B60R 2021/23316; B60R 2021/23324; B60R 2021/23332
See application file for complete search history.

(56) References Cited

U.S. PATENT DOCUMENTS

| 5,733,003 A * | 3/1998 | Goor ......................... B60N 2/26 |
|---|---|---|
| | | 297/216.11 |
| 6,846,008 B2 * | 1/2005 | Kamiji .................. B60R 21/231 |
| | | 280/729 |

(Continued)

FOREIGN PATENT DOCUMENTS

| CN | 103029673 | 4/2013 |
|---|---|---|
| CN | 103328276 | 9/2013 |

(Continued)

OTHER PUBLICATIONS

Japanese Notice of Allowance for Japanese Patent Application No. 2017-203546 dated Aug. 25, 2020.

(Continued)

*Primary Examiner* — Barry Gooden, Jr.
(74) *Attorney, Agent, or Firm* — Amin, Turocy & Watson, LLP (57) ABSTRACT

An airbag apparatus includes an airbag bag body that is inflated and expanded by a gas which is generated from an inflator. The airbag bag body includes an inner bag and an outer bag. The inner bag is inflated and expanded by the gas which is supplied from the inflator. The outer bag covers the inner bag and communicates with the inner bag via a communication hole. The outer bag has a depression part on a lower part of the outer bag in a state of being supplied with the gas through the communication hole from the inner bag and being inflated and expanded.

2 Claims, 7 Drawing Sheets

(56) References Cited

U.S. PATENT DOCUMENTS

| | | | | |
|---|---|---|---|---|
| 7,607,683 | B2* | 10/2009 | Fischer | B60R 21/231 280/730.1 |
| 7,731,232 | B2* | 6/2010 | Higuchi | B60R 21/2346 280/739 |
| 7,992,897 | B2* | 8/2011 | Sekino | B60R 21/233 280/739 |
| 8,657,334 | B2* | 2/2014 | Mallinger | B60R 21/2338 280/743.1 |
| 8,944,462 | B2* | 2/2015 | Fischer | B60R 21/205 280/743.1 |
| 9,815,428 | B2* | 11/2017 | Anderson | B60R 21/2338 |
| 2002/0063416 | A1* | 5/2002 | Kamaiji | B60R 21/231 280/728.2 |
| 2008/0143086 | A1* | 6/2008 | Higuchi | B60R 21/233 280/736 |
| 2009/0250912 | A1* | 10/2009 | Libby | B60R 21/233 280/730.1 |
| 2010/0213692 | A1* | 8/2010 | Nagai | B60R 21/2346 280/729 |
| 2011/0260431 | A1* | 10/2011 | Kwon | B60R 21/2338 280/730.1 |
| 2012/0013106 | A1* | 1/2012 | Sato | B60R 21/205 280/729 |
| 2012/0261910 | A1* | 10/2012 | Fischer | B60R 21/205 280/732 |
| 2015/0258958 | A1* | 9/2015 | Belwafa | B60R 21/233 280/729 |
| 2015/0367802 | A1* | 12/2015 | Fukawatase | B60R 21/205 280/732 |
| 2016/0001733 | A1* | 1/2016 | Kim | B60R 21/233 280/728.3 |
| 2016/0107598 | A1* | 4/2016 | Fischer | B60R 21/207 280/729 |
| 2017/0028955 | A1* | 2/2017 | Ohno | B60R 21/207 |
| 2017/0057453 | A1* | 3/2017 | Morris | B60R 21/233 |
| 2018/0001863 | A1* | 1/2018 | Nakanishi | B60R 21/205 |
| 2018/0015902 | A1* | 1/2018 | Maenishi | B60R 21/233 |
| 2018/0056920 | A1* | 3/2018 | Paxton | B60R 21/233 |
| 2018/0126945 | A1* | 5/2018 | Aranzulla | B60R 21/233 |
| 2018/0222431 | A1* | 8/2018 | Nakanishi | B60R 21/231 |
| 2018/0251093 | A1* | 9/2018 | Rose | B60R 21/01552 |
| 2018/0354447 | A1* | 12/2018 | Nakajima | B60R 21/203 |
| 2018/0361978 | A1* | 12/2018 | Belwafa | B60R 21/233 |
| 2019/0016294 | A1* | 1/2019 | Hayashi | B60R 21/239 |
| 2019/0111879 | A1* | 4/2019 | Ohmi | B60R 21/207 |
| 2019/0217806 | A1* | 7/2019 | Hotta | B60R 21/203 |
| 2020/0031306 | A1* | 1/2020 | Nakajima | B60R 21/264 |
| 2020/0062211 | A1* | 2/2020 | Deng | B60R 21/205 |

FOREIGN PATENT DOCUMENTS

| | | |
|---|---|---|
| CN | 107031557 | 8/2017 |
| JP | 2001-334900 | 12/2001 |
| JP | 2002-160600 | 6/2002 |
| JP | 2005-088683 | 4/2005 |
| JP | 2012-153171 | 8/2012 |

OTHER PUBLICATIONS

Chinese Office Action for Chinese Patent Application No. 201811175679.2 dated Dec. 3, 2020.

* cited by examiner

FIG. 7

AIRBAG APPARATUS

CROSS-REFERENCE TO RELATED APPLICATION

Priority is claimed on Japanese Patent Application No. 2017-203546, filed on Oct. 20, 2017, the contents of which are incorporated herein by reference.

BACKGROUND

Field of the Invention

The present invention relates to an airbag apparatus.

Background

As an airbag apparatus, for example, one such apparatus is known in which an airbag bag body is stored in a folded state in a storage part of an instrument panel, the storage part being provided at a vehicle body frontward position of a passenger seat. This airbag apparatus restrains a passenger by inflating and expanding the airbag bag body toward the occupant of the passenger seat by supplying a gas to the airbag bag body at the time of collision of a vehicle.

For example, it is conceivable that a baby seat is attached to the passenger seat in a state of being directed in a vehicle rearward direction. In this case, a backrest (hereinafter, referred to as an obstacle) of the baby seat is present in the vicinity of a vehicle body rearward position of the instrument panel. In this way, even when an obstacle is present in the vicinity of the vehicle body rearward position of the instrument panel, it is necessary to smoothly inflate and expand the airbag bag body. Alternatively, even when the airbag bag body comes into contact with the obstacle, it is necessary to reduce an impact to the airbag bag body. Further, it is necessary to stabilize the shape of the airbag bag body even after the airbag bag body is inflated and expanded.

In order to solve this problem, an airbag apparatus is known in which a pocket (hereinafter, referred to as a depression part) having a bag shape is formed on a lower surface of an inflated and expanded airbag bag body. According to this airbag apparatus, by accommodating an obstacle by the depression part, it is possible to smoothly inflate and expand the airbag bag body. Alternatively, when the airbag bag body comes into contact with the obstacle, it is possible to reduce an impact to the airbag bag body. Further, it is possible to stabilize the shape of the airbag bag body after inflation and expansion (for example, refer to Japanese Patent Application, Publication No. 2002-160600).

SUMMARY

Among airbag apparatuses, an airbag apparatus is known in which an airbag bag body is formed in a double structure of an inner bag and an outer bag. By forming the airbag bag body in a double structure, for example, it becomes possible to form a restraining part having a bag shape on a region that is opposed to the occupant.

Specifically, by forming an opening part on a region that is opposed to the occupant of the outer bag and closing a bottom portion of the opening part by the inner bag, the restraining part having a bag shape is formed of the inner bag and a circumferential wall portion of the opening part.

In this way, by forming the restraining part having a bag shape on the region that is opposed to the occupant, it becomes possible to restrain the occupant in a further stable state by the restraining part having a bag shape.

Even in this airbag apparatus, similarly to the airbag apparatus of Japanese Patent Application, Publication No. 2002-160600, it is necessary to form a depression part that corresponds to an obstacle on a lower part of the airbag bag body having a double structure.

An aspect of the present invention provides an airbag apparatus that is capable of forming a depression part which corresponds to an obstacle on a lower part of an airbag bag body having a double structure.

An aspect of the present invention is an airbag apparatus that protects an occupant, the apparatus comprising: an airbag bag body that is inflated and expanded by a gas which is generated from an inflator, wherein the airbag bag body comprises: an inner bag that is inflated and expanded by the gas which is supplied from the inflator; and an outer bag that covers the inner bag and that communicates with the inner bag via a communication hole, and the outer bag has a depression part that is formed on a lower part of the outer bag in a state of being supplied with the gas through the communication hole from the inner bag and being inflated and expanded.

In this way, the airbag bag body is formed in a double structure of the inner bag and the outer bag.

Further, in a state where the airbag bag body is inflated and expanded, the depression part is formed on the lower part of the outer bag. That is, it is possible to form the depression part that corresponds to with an obstacle on the lower part of the airbag bag body having a double structure.

It is possible to arbitrarily adjust the depth size of the depression part in a range of the thickness size of the lower part of the outer bag. Thereby, it is possible to favorably ensure the degree of freedom of design of the inner bag and the outer bag.

The depression part is formed of a circumferential side wall and a bottom portion. By connecting the bottom portion to the circumferential side wall, it is possible to ensure the shape of the depression part in a stable state by the circumferential side wall and the bottom portion. Thereby, when the airbag bag body is inflated and expanded, it is possible to enhance a shape stability of the airbag bag body.

By forming the depression part on the lower part (that is, the lower part of the airbag bag body) of the outer bag, and furthermore, by enhancing the shape stability of the airbag bag body, it is possible to favorably accommodate the obstacle by the depression part.

Thereby, it is possible to smoothly inflate and expand the airbag bag body.

Further, by accommodating the obstacle by the depression part, when the airbag bag body comes into contact with the obstacle, it is possible to absorb an impact that is given to the obstacle. Further, by accommodating the obstacle by the depression part, it is possible to stabilize the shape of the airbag bag body after inflation and expansion.

In this way, by smoothly inflating and expanding the airbag bag body, and furthermore, by stabilizing the shape of the airbag bag body after inflation and expansion, it is possible to favorably restrain and protect the occupant by the airbag bag body.

In the airbag apparatus described above, a bottom portion of the depression part may be sewn to the inner bag.

In this way, by sewing the bottom portion of the depression part to the inner bag, it is possible to stably maintain the depression part on the inner bag. Thereby, it is possible to further favorably accommodate the obstacle by the depression part. Furthermore, by further favorably accommodating the obstacle by the depression part, it is possible to further stabilize the shape of the airbag bag body after inflation and expansion.

Another aspect of the present invention is an airbag apparatus that protects an occupant, the apparatus comprising: an airbag bag body that is inflated and expanded by a gas which is generated from an inflator, wherein the airbag bag body comprises: an inner bag that is inflated and expanded by the gas which is supplied from the inflator; and an outer bag that covers the inner bag and that communicates with the inner bag via a communication hole, the outer bag has an opening part that is formed on a lower part of the outer bag in a state of being supplied with the gas through the communication hole from the inner bag and being inflated and expanded, the inner bag has a recess part at a region that is opposed to the opening part, and a depression part is formed of the opening part and the recess part.

In this way, the airbag bag body is formed in a double structure of the inner bag and the outer bag.

Further, in a state where the airbag bag body is inflated and expanded, the depression part is formed of the opening part of the outer bag and the recess part of the inner bag. That is, it is possible to form the depression part that corresponds to an obstacle on the lower part of the airbag bag body having a double structure.

By forming the depression part by the opening part of the outer bag and the recess part of the inner bag, it is possible to arbitrarily adjust the depth size of the depression part without being restricted by the thickness size of the outer bag. Thereby, it is possible to favorably ensure the degree of freedom of design of the inner bag and the outer bag.

The depression part is formed on the lower part of the airbag bag body by the opening part of the outer bag and the recess part of the inner bag. Accordingly, it is possible to favorably accommodate the obstacle by the depression part when inflating and expanding the airbag bag body. Thereby, it is possible to smoothly inflate and expand the airbag bag body.

Further, by accommodating the obstacle by the depression part, when the airbag bag body comes into contact with the obstacle, it is possible to absorb an impact that is given to the obstacle. Further, by accommodating the obstacle by the depression part, it is possible to stabilize the shape of the airbag bag body after inflation and expansion.

In this way, by smoothly inflating and expanding the airbag bag body, and furthermore, by stabilizing the shape of the airbag bag body after inflation and expansion, it is possible to favorably restrain and protect the occupant by the airbag bag body.

According to an aspect of the present invention, it is possible to form the airbag bag body in a double structure of the inner bag and the outer bag and form the depression part which corresponds to an obstacle on the lower part of the airbag bag body having a double structure.

DESCRIPTION OF THE EMBODIMENTS

An embodiment of the present invention will be described with reference to the drawings. In the drawings, an arrow FR indicates a frontward direction of a vehicle, an arrow UP indicates an upward direction of the vehicle, and an arrow LH indicates a leftward direction of the vehicle. An embodiment is described using an example of a vehicle 10 in which a driver seat 13 on the driver's side is arranged on a right side of the vehicle, and a passenger seat 14 on the passenger's side is arranged on a left side of the vehicle.

First Embodiment

Figure 1:
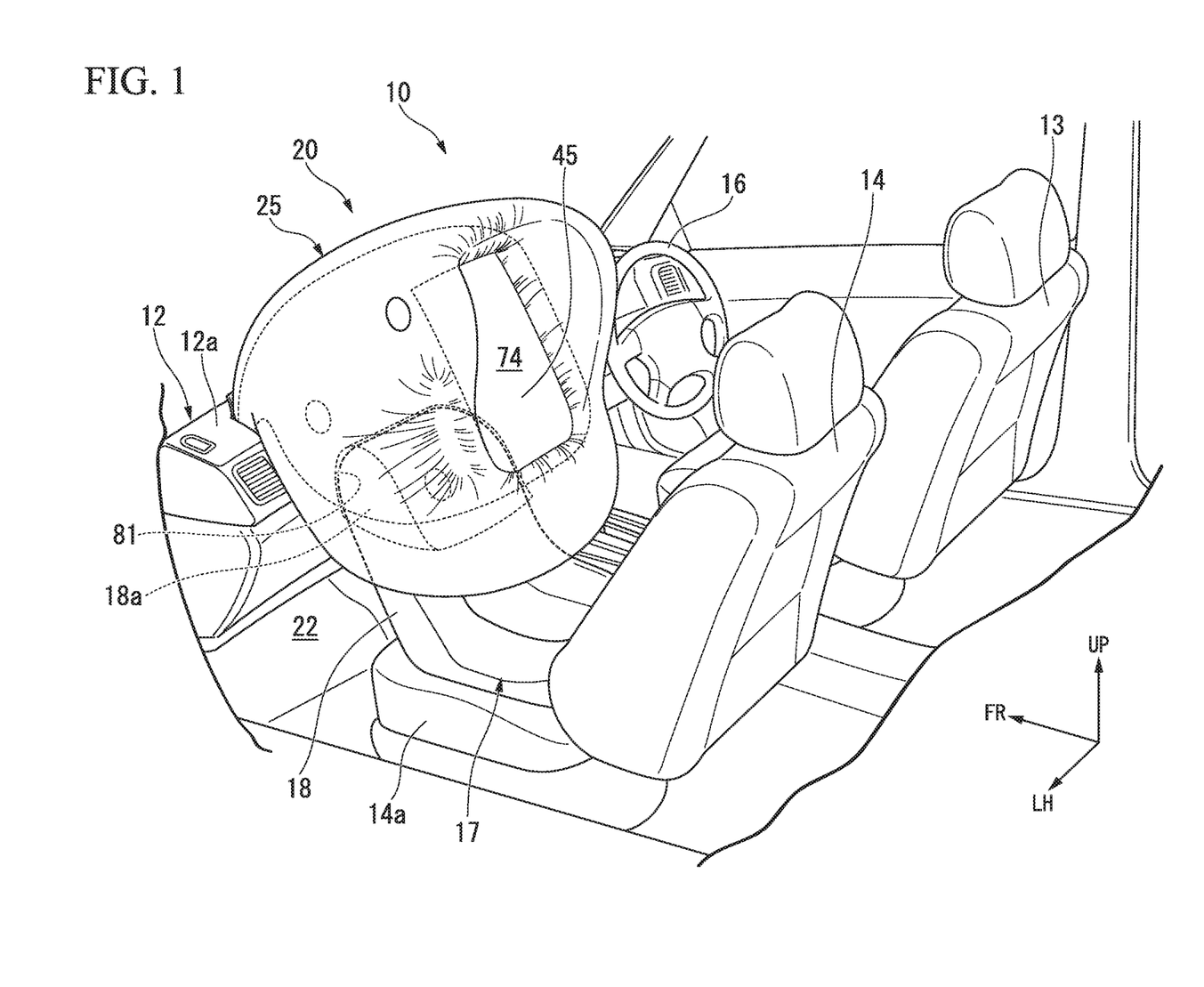
FIG. 1 is a perspective view showing a vehicle that includes an airbag apparatus according to a first embodiment of the present invention.

As shown in FIG. 1, the vehicle 10 includes an instrument panel 12, the driver seat 13, the passenger seat 14, a steering wheel 16, and an airbag apparatus 20.

The instrument panel 12 is provided at a vehicle body frontward position of a vehicle room 22. The driver seat 13 and the passenger seat 14 are provided at a vehicle body rearward position of the instrument panel 12. The steering wheel 16 is provided at a vehicle body frontward position of the driver seat 13.

A baby seat 17 is attached to a seat cushion 14a of the passenger seat 14 so as to be directed in a rearward direction in a vehicle body front-to-rear direction. In this state, a backrest part 18 of the baby seat 17 is arranged at substantially the same height as an upper wall part 12a of the instrument panel 12 in the vicinity of the instrument panel 12 and at a vehicle body rearward position of the instrument panel 12. Hereinafter, the backrest part 18 of the baby seat 17 is described as an "obstacle 18".

An airbag bag body 25 of the airbag apparatus 20 is stored in a folded state in an inner part (hereinafter, referred to as a storage inner part) of a region of the instrument panel 12, the region being opposed to the passenger seat 14 and the obstacle 18 (specifically, an upper part 18a of the obstacle 18).

Figure 2:
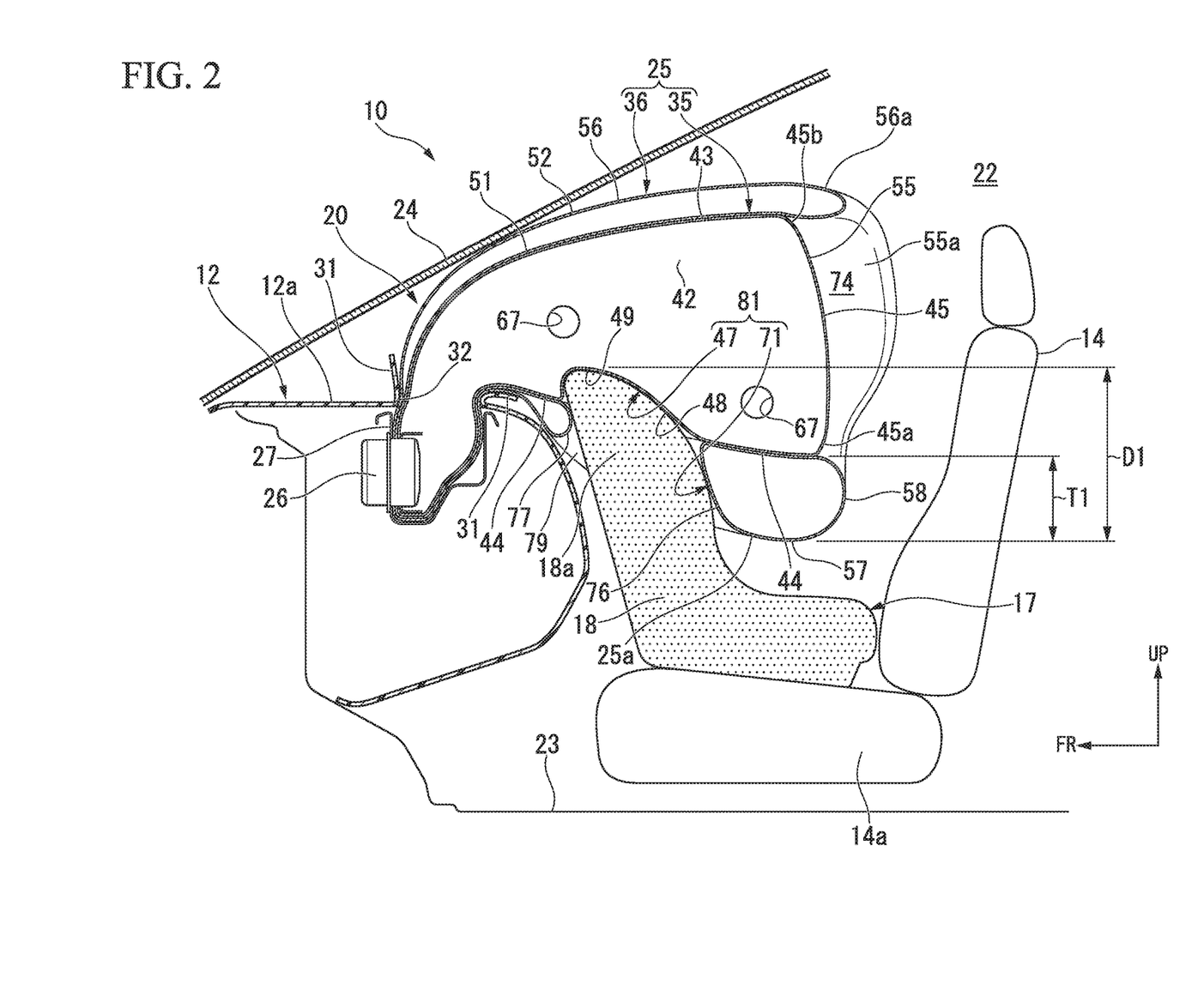
FIG. 2 is a cross-sectional view showing the airbag apparatus according to the first embodiment of the present invention.

As shown in FIG. 2, the airbag apparatus 20 includes the airbag bag body 25, an inflator 26, and a retainer 27. The airbag bag body 25 is embedded in a folded state together with the inflator 26 and the retainer 27 in the storage inner part of the instrument panel 12.

When an impact energy is input to the vehicle 10, the inflator 26 generates a gas and supplies the gas to the airbag bag body 25. The gas is supplied to the airbag bag body 25, and thereby, the airbag bag body 25 is inflated and expanded.

The inflator 26 and the folded airbag bag body 25 are held by the retainer 27 in the storage inner part of the instrument panel 12.

A breakage guide part (tear line) is provided on an upper wall portion 12a above the storage inner part of the instrument panel 12. The breakage guide part is formed such that, when the airbag bag body 25 is inflated and expanded, the breakage guide part is broken by a press force of the inflated and expanded airbag bag body 25. An expansion wall 31 is formed of a region that is surrounded by the breakage guide part.

When the airbag bag body 25 is inflated and expanded, the breakage guide part is broken by the airbag bag body 25, and thereby, the expansion wall 31 opens upward like a door. The expansion wall 31 opens upward, and thereby, an opening 32 is formed on the upper wall portion 12*a*. The airbag bag body 25 is inflated and expanded from the opening 32 toward the obstacle 18 and the upper body of an occupant. The occupant is protected by restraining the upper body of the occupant by the inflated and expanded airbag bag body 25.

Figure 3:
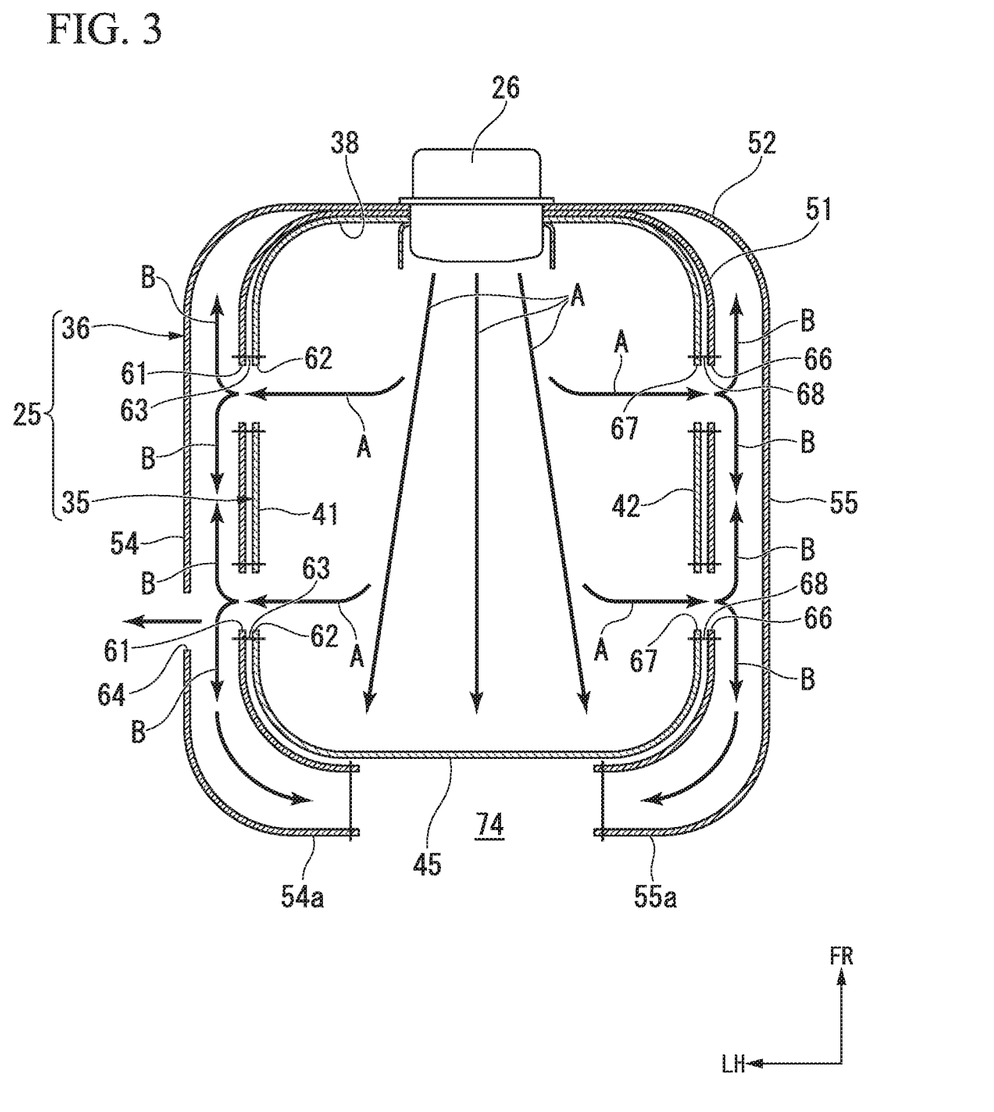
FIG. 3 is a schematic view showing the airbag apparatus according to the first embodiment of the present invention.

As shown in FIG. 2 and FIG. 3, the airbag bag body 25 includes an inner bag 35 and an outer bag 36 and is formed in a double structure by the bags 35, 36.

The inner bag 35 is formed in a state of communicating with the inflator 26 of an inner foundation cloth 38 in a bag shape. The inner foundation cloth 38 is formed in a bag shape, for example, by using an airproof soft material such as a nylon fabric cloth and by using a polyamide yarn and the like. It is preferable that an inner surface of the inner foundation cloth 38 is coated by a rubber, silicon, or the like having heat resistance.

A gas is supplied from the inflator 26 as indicated by an arrow A, and thereby, the inner bag 35 is inflated and expanded by the supplied gas. The inner bag 35 has an inner left side part 41, an inner right side part 42, an inner upper part 43, an inner lower part (lower part) 44, and an inner rearward sloped part 45 in an inflated and expanded state.

The inner left side part 41 is arranged substantially vertically on a left side in the vehicle width direction. The inner right side part 42 is arranged substantially vertically on a right side in the vehicle width direction. The inner upper part 43 is arranged so as to be opposed to a front window glass 24. The inner lower part 44 is arranged so as to be opposed to a floor part 23 of the vehicle room 22. The inner lower part 44 has an inner recess portion (recess part) 47 that is recessed toward the upward direction.

The inner recess portion 47 of the inner lower part 44 is described later in detail.

The inner rearward sloped part 45 is arranged so as to be opposed to the passenger seat 14 (that is, the upper body of the occupant of the passenger seat 14). Specifically, the inner rearward sloped part 45 extends as a rising slope from a lower end portion 45*a* to an upper end portion 45*b* toward a vehicle body frontward direction. The inner rearward sloped part 45 is opposed to the upper body of the occupant of the passenger seat 14, and thereby, it is possible to restrain the upper body of the occupant of the passenger seat 14 by the inner rearward sloped part 45.

In a state where the airbag bag body 25 is inflated and expanded, the inner bag 35 is covered by the outer bag 36 from the outside. In this state, the inner rearward sloped part 45 is exposed to the vehicle room 22.

The outer bag 36 includes a first outer foundation cloth 51 and a second outer foundation cloth 52. The first outer foundation cloth 51 is a foundation cloth on the inside that covers the inner bag 35 from the outside. The second outer foundation cloth 52 is a foundation cloth on the outside that covers the first outer foundation cloth 51 from the outside.

For example, an airproof soft material such as a nylon fabric cloth is used for the first outer foundation cloth 51 and the second outer foundation cloth 52, similarly to the inner foundation cloth 38. The first outer foundation cloth 51 and the second outer foundation cloth 52 are sewn in a bag shape in a state of being overlapped with each other by using a polyamide yarn and the like, and thereby, the outer bag 36 is manufactured by sewing. It is preferable that inner surfaces of first outer foundation cloth 51 and the second outer foundation cloth 52 are coated by a rubber, silicon, or the like having heat resistance.

Specifically, the outer bag 36 has an outer left side part 54, an outer right side part 55, an outer upper part 56, an outer lower part (lower part, lower surface) 57, and an outer rear lower part 58 in an inflated and expanded state.

Figure 4:
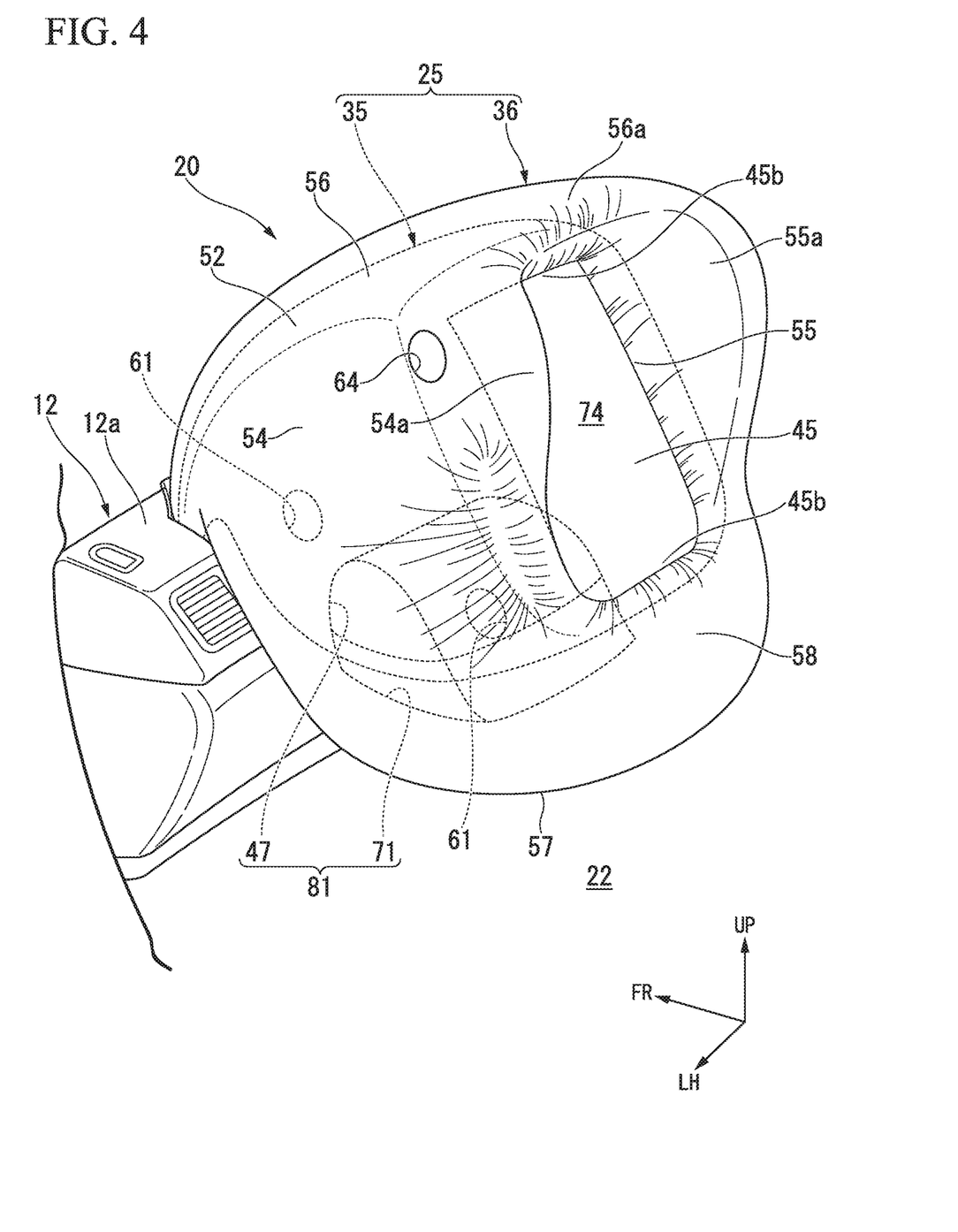
FIG. 4 is a perspective view of the airbag apparatus according to the first embodiment of the present invention.

As shown in FIG. 3 and FIG. 4, the outer left side part 54 is formed of parts of the first outer foundation cloth 51 and the second outer foundation cloth 52, the parts being arranged on a left side in the vehicle width direction of the inner left side part 41. The outer left side part 54 has an outer left rear portion 54*a* that protrudes in a vehicle body rearward direction from the inner rearward sloped part 45.

A plurality of vent holes 61 are formed on the first outer foundation cloth 51 of the outer left side part 54. The vent holes 61 communicate with a vent hole 62 of the inner left side part 41 via a left communication hole (communication hole) 63. That is, the outer left side part 54 communicates with the inner bag 35 via the left communication hole 63.

In the outer left rear portion 54*a* of the outer left side part 54, a vent hole 64 is formed on the second outer foundation cloth 52.

The outer right side part 55 is formed of parts of the first outer foundation cloth 51 and the second outer foundation cloth 52, the parts being arranged on a right side in the vehicle width direction of the inner right side part 42. The outer right side part 55 has an outer right rear portion 55*a* that protrudes in a vehicle body rearward direction from the inner rearward sloped part 45.

A plurality of vent holes 66 are formed on the first outer foundation cloth 51 of the outer right side part 55. The vent holes 66 communicate with a vent hole 67 of the inner left side part 41 via a right communication hole (communication hole) 68. That is, the outer right side part 55 communicates with the inner bag 35 via the right communication hole 68.

With reference back to FIG. 2, the outer upper part 56 is formed of parts of the first outer foundation cloth 51 and the second outer foundation cloth 52, the parts being arranged on an upper side of the inner upper part 43. The outer upper part 56 has an outer upper rear portion 56*a* (refer also to FIG. 4) that protrudes in the vehicle body rearward direction from the inner rearward sloped part 45.

The outer lower part 57 is formed of parts of the first outer foundation cloth 51 and the second outer foundation cloth 52, the parts being arranged on a lower side of the inner lower part 44. The outer lower part 57 has an outer opening portion (opening part) 71 that is formed in a state where the airbag bag body 25 is inflated and expanded. The outer opening portion 71 is opened such that the outer lower part 57 penetrates through the outer opening portion 71 in the vertical direction.

The inner recess portion 47 of the inner lower part 44 is arranged at a region that is opposed to the outer opening portion 71.

The outer opening portion 71 of the outer lower part 57 is described later together with the inner recess portion 47 of the inner lower part 44 in detail.

The outer rear lower part 58 is formed of parts of the first outer foundation cloth 51 and the second outer foundation cloth 52, the parts being arranged on a lower side of the inner rearward sloped part 45. The outer rear lower part 58 is arranged in a swelling state in the vehicle body rearward direction with respect to the lower end portion 45*a* of the inner rearward sloped part 45 (also refer to FIG. 4).

As shown in FIG. 3 and FIG. 4, the outer left side part 54, the outer right side part 55, the outer upper part 56, the outer lower part 57, and the outer rear lower part 58 of the outer bag 36 communicate with one another. That is, the outer bag 36 is formed of the first outer foundation cloth 51 and the second outer foundation cloth 52 in a hollow shape.

The outer left side part 54 communicates with the inner bag 35 via the left communication hole 63.

The outer right side part 55 communicates with the inner bag 35 via the right communication hole 68.

In a state where the inner bag 35 is inflated and expanded by a gas, the gas is continuously supplied to the inner bag 35. Accordingly, the gas that is supplied to the inner bag 35 is supplied to the outer bag 36 through the left communication hole 63 and the right communication hole 68 as indicated by an arrow B.

The gas is supplied to the outer bag 36, and thereby, the outer bag 36 is inflated and expanded by the gas. Thereby, the airbag bag body 25 is inflated and expanded.

In this state, the outer left rear portion 54a of the outer left side part 54 protrudes in the vehicle body rearward direction from the inner rearward sloped part 45. The outer right rear portion 55a of the outer right side part 55 protrudes in the vehicle body rearward direction from the inner rearward sloped part 45. The outer upper rear portion 56a of the outer upper part 56 protrudes in the vehicle body rearward direction from the inner rearward sloped part 45. The outer rear lower part 58 swells in the vehicle body rearward direction from the lower end portion 45a of the inner rearward sloped part 45.

Accordingly, a restraining part 74 having a bag shape is formed of the outer left rear portion 54a, the outer right rear portion 55a, the outer upper rear portion 56a, the outer rear lower part 58, and the inner rearward sloped part 45. The restraining part 74 having a bag shape is formed on a region of the airbag bag body 25, the region being opposed to the upper body of the occupant of the passenger seat 14.

In this way, the airbag bag body 25 is formed in a double structure of the inner bag 35 and the outer bag 36, and thereby, it is possible to form the restraining part 74 having a bag shape on the region that is opposed to the upper body of the occupant of the passenger seat 14. Thereby, the upper body of the occupant is restrained in a further stable state by the restraining part 74 having a bag shape, and thereby, it is possible to further favorably protect the upper body of the occupant.

Next, the outer opening portion 71 of the outer lower part 57 and the inner recess portion 47 of the inner lower part 44 are described with reference to FIG. 2 and FIG. 5.

Figure 5:
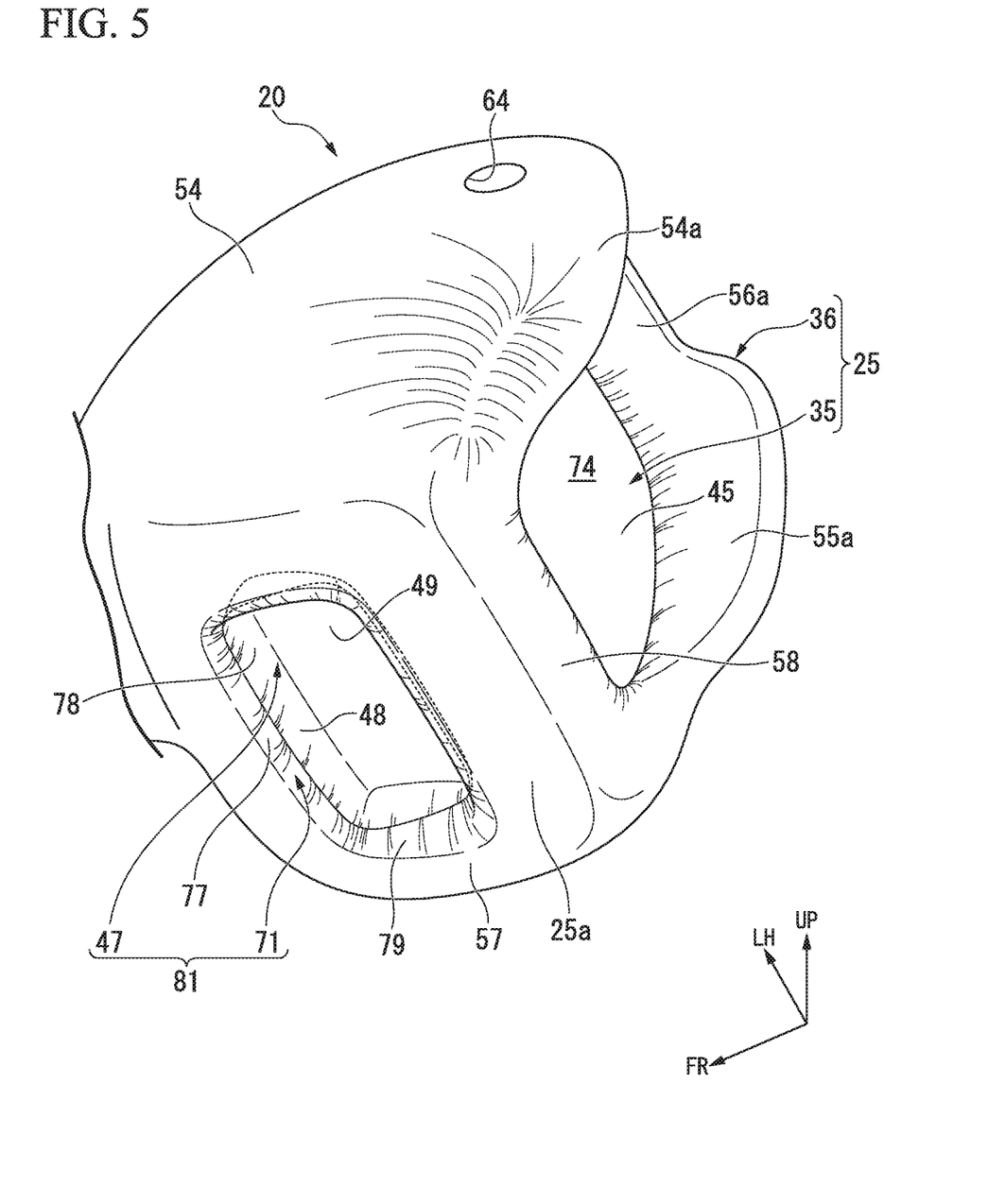
FIG. 5 is a perspective view of the airbag apparatus seen from a vehicle body rearward downward direction according to the first embodiment of the present invention.

As shown in FIG. 2 and FIG. 5, the outer opening portion 71 is formed on the outer lower part 57. The outer opening portion 71 is opened such that the outer lower part 57 penetrates through the outer opening portion 71 in the vertical direction. Specifically, the outer opening portion 71 is formed in a circumferential side wall having a rectangular shape in a bottom view of a front wall 76, a rear wall 77, a left side wall 78, and a right side wall 79.

The inner recess portion 47 is formed on the inner lower part 44. The inner recess portion 47 has a circumferential side wall 48 that is formed in a rectangular shape in a bottom view similarly to the outer opening portion 71 and a bottom portion 49 that closes an upper end part of the circumferential side wall 48. That is, the inner recess portion 47 is formed in a depression having a bottom so as to be recessed toward the upward direction.

The airbag bag body 25 is formed in a double structure of the inner bag 35 and the outer bag 36. Further, in a state where the airbag bag body 25 is inflated and expanded, the inner recess portion 47 of the inner lower part 44 is arranged at the region that is opposed to the outer opening portion 71.

The inner recess portion 47 is formed so as to be recessed toward the upward direction from the outer opening portion 71. Accordingly, it is possible to form a depression part 81 by the outer opening portion 71 and the inner recess portion 47 at a lower part 25a of the airbag bag body 25 having a double structure. The depression part 81 is formed in a rectangular shape so as to be depressed toward the upward direction at a region that corresponds to the backrest part 18 (that is, the upper part 18a of the obstacle 18) of the baby seat 17 and the like.

The first embodiment is described using an example in which the depression part 81 is formed in a rectangular shape; however, the shape of the depression part 81 is not limited to a rectangular shape. For example, it is also possible to form the depression part 81 in another shape such as an oval shape or a round shape.

In this way, by combining the outer opening portion 71 of the outer lower part 57 and the inner recess portion 47 of the inner lower part 44 and forming the depression part 81, it is possible to arbitrarily adjust the depth size D1 of the depression part 81 without being restricted by the thickness size T1 of the outer lower part 57.

Accordingly, for example, it is possible to enhance the degree of freedom when determining the thickness size T1 of the outer lower part 57 and the thickness size of the inner lower part 44. Thereby, it is possible to favorably ensure the degree of freedom of design of the inner bag 35 and the outer bag 36.

The obstacle 18 is arranged at substantially the same height as the upper wall part 12a in the vicinity of the instrument panel 12 and at a vehicle body rearward position of the instrument panel 12. Therefore, for example, when the depression part 81 is not formed at the lower part 25a of the airbag bag body 25, it is conceivable that, when the airbag bag body 25 is inflated and expanded, the obstacle 18 becomes an impediment that prevents the airbag bag body 25 from being smoothly inflated and expanded.

Therefore, in the first embodiment, the depression part 81 is formed on the lower part 25a of the airbag bag body 25. Accordingly, it is possible to favorably accommodate the upper part 18a of the obstacle 18 by the depression part 81 when the airbag bag body 25 is inflated and expanded. Thereby, it is possible to smoothly inflate and expand the airbag bag body 25.

Further, by accommodating the upper part 18a of the obstacle 18 by the depression part 81, it is possible to absorb the impact that is given to the obstacle 18 when the airbag bag body 25 comes into contact with the obstacle 18. Further, by accommodating the upper part 18a of the obstacle 18 by the depression part 81, it is possible to stabilize the shape of the airbag bag body 25 after inflation and expansion.

In this way, by stabilizing the shape of the airbag bag body 25 after inflation and expansion, it is possible to stably form the restraining part 74 having a bag shape on the airbag bag body 25. Thereby, it becomes possible to favorably restrain and protect the upper body of the occupant by the restraining part 74 having a bag shape.

Next, an airbag apparatus 100 of a second embodiment is described with reference to FIG. 6 and FIG. 7. In the second embodiment, a configuration which is the same as or similar to that of the airbag apparatus 20 of the first embodiment is given by the same reference numeral, and detailed description of the configuration is omitted.

Second Embodiment

Figure 6:
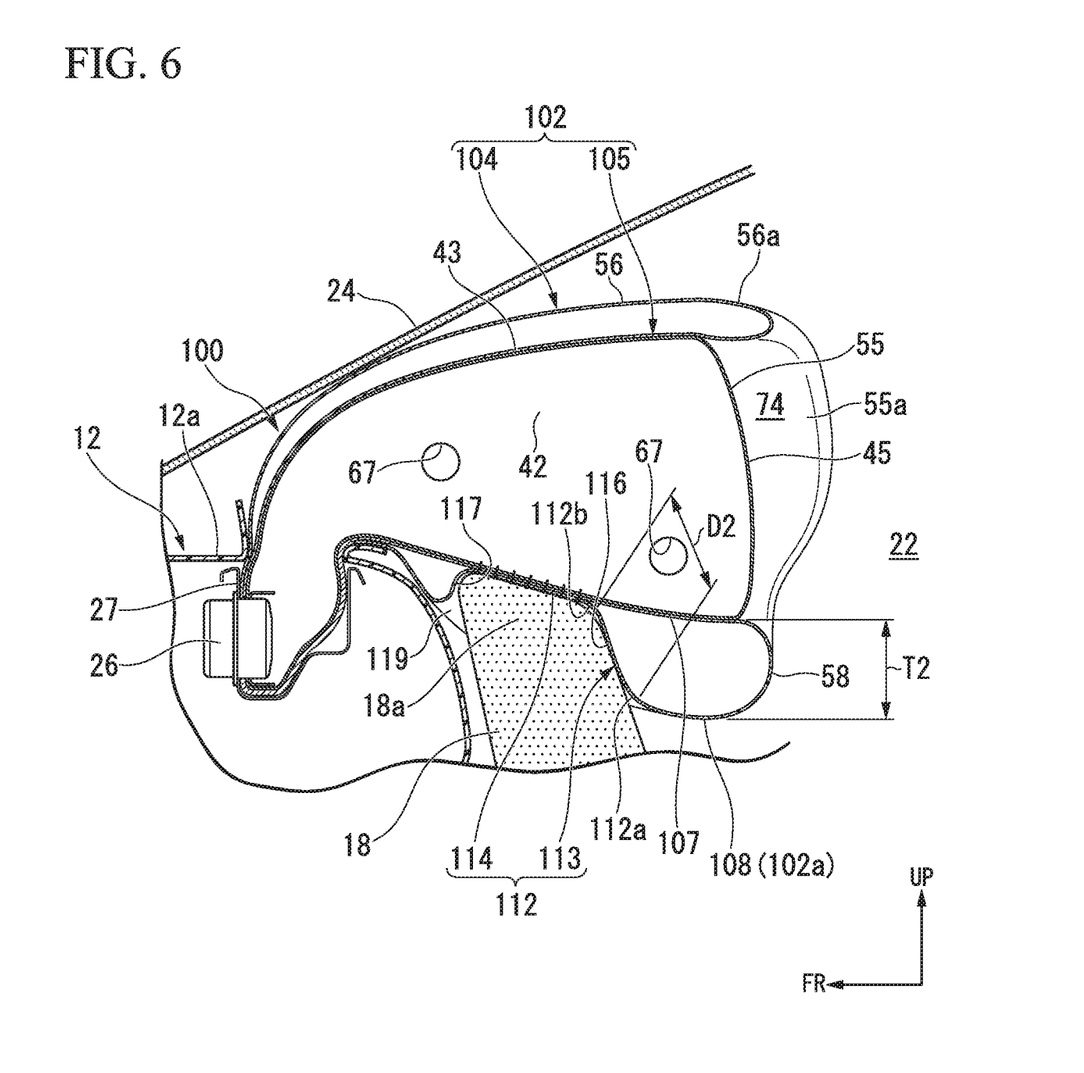
FIG. 6 is a cross-sectional view showing an airbag apparatus according to a second embodiment of the present invention.
Figure 7:
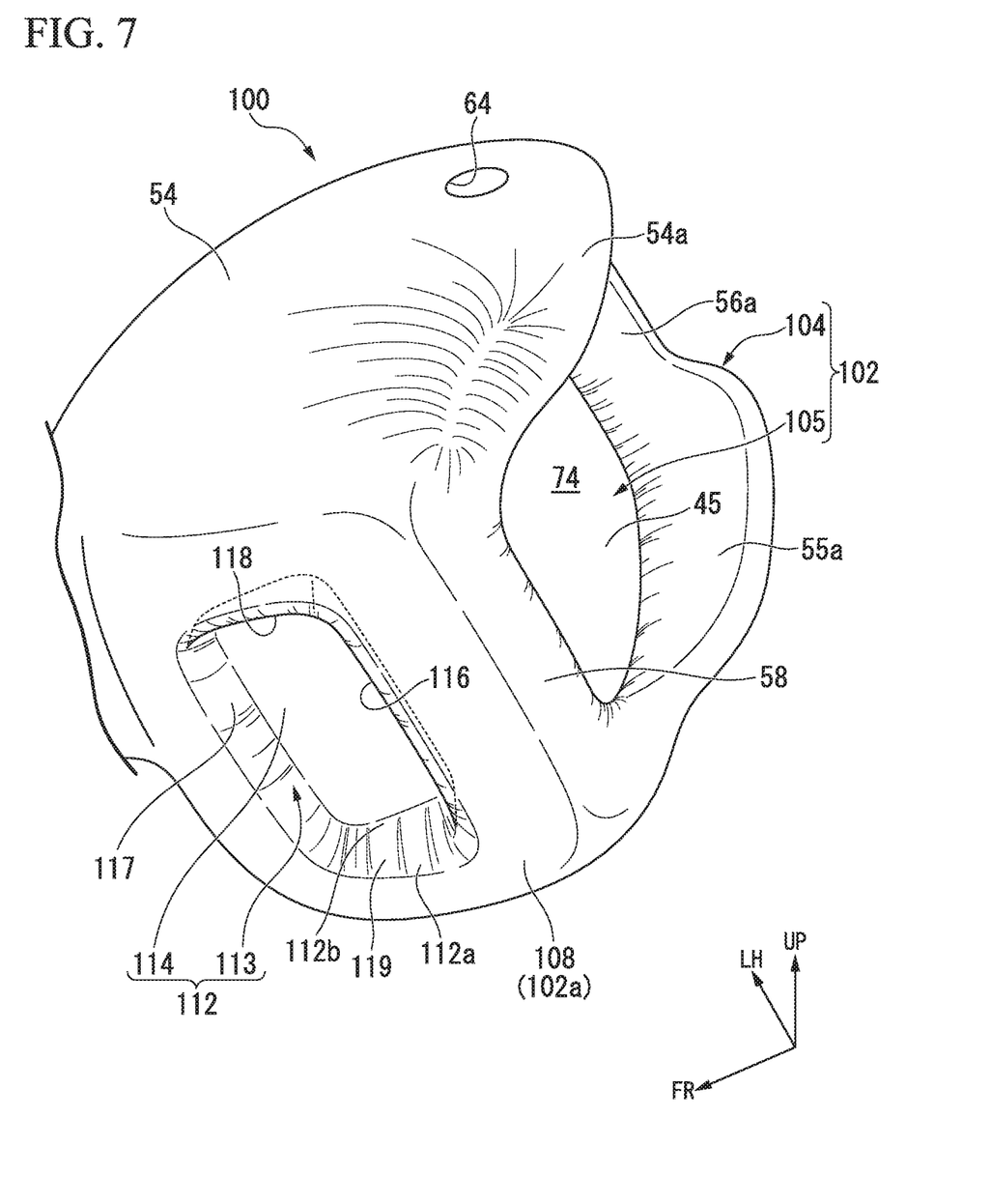
FIG. 7 is a perspective view of the airbag apparatus seen from a vehicle body rearward downward direction according to the second embodiment of the present invention.

As shown in FIG. 6 and FIG. 7, in the airbag apparatus 100, a depression part 112 is formed only on an outer bag 105 of an airbag bag body 102. Other configurations of the airbag apparatus 100 are similar to the airbag apparatus 20 of the first embodiment.

Specifically, the airbag apparatus 100 includes the airbag bag body 102, the inflator 26, and the retainer 27. The airbag bag body 102 includes an inner bag 104 and the outer bag 105 and is formed in a double structure by the bags 104, 105.

The inner bag 104 has the inner left side part 41 (refer to FIG. 3), the inner right side part 42, the inner upper part 43, an inner lower part (lower part) 107, and an inner rearward sloped part 45 in an inflated and expanded state. The inner lower part 107 is different from the inner lower part 44 of the first embodiment in that the inner recess portion 47 (refer to FIG. 2) is not formed. The inner lower part 107 is arranged so as to be opposed to the floor part 23 (refer to FIG. 2) of the vehicle room 22 similarly to the inner lower part 44 of the first embodiment and is formed to be substantially flat.

The outer bag 36 has the outer left side part 54 (refer to FIG. 3), the outer right side part 55, the outer upper part 56, an outer lower part (lower part, lower surface) 108, and the outer rear lower part 58 in an inflated and expanded state. The outer lower part 108 has the depression part 112 that is formed in a state where the airbag bag body 25 is inflated and expanded.

That is, the depression part 112 is formed on a lower part 102a of the airbag bag body 102.

The depression part 112 is formed so as to be depressed toward the upward direction from the outer lower part 108 (that is, the lower part 102a of the airbag bag body 102).

The depression part 112 has a circumferential side wall 113 and a bottom portion 114. The circumferential side wall 113 is formed of a front wall 116, a rear wall 117, a left side wall 118, and a right side wall 119 in a rectangular shape in a bottom view. The bottom portion 114 is connected to an end part on the inner lower part 107 side of the circumferential side wall 113.

Specifically, the depression part 112 is formed of the circumferential side wall 113 and the bottom portion 114 in a depression having a bottom. A lower end portion 112a of the depression part 112 is opened, and an upper end portion 112b of the depression part 112 is closed by the bottom portion 114. The bottom portion 114 of the depression part 112 is sewn to the inner lower part 107 of the inner bag 104. The depression part 112 is formed on a region that corresponds to the obstacle 18 (specifically, the upper part 18a of the obstacle 18).

The second embodiment is described using an example in which the depression part 112 is formed in a rectangular shape; however, the shape of the depression part 112 is not limited to a rectangular shape. For example, it is also possible to form the depression part 112 in another shape such as an oval shape or a round shape.

Further, the second embodiment is described using an example in which a depth size D2 of the depression part 112 is formed to be substantially the same as a thickness size T2 of the outer lower part 108; however, it is possible to appropriately change the depth size D2 of the depression part 112. That is, by forming the depression part 112 on the outer lower part 108, it is possible to arbitrarily adjust the depth size D2 of the depression part 112 in a range of the thickness size T2 of the outer lower part 108. Thereby, it is possible to favorably ensure the degree of freedom of design of the inner bag 104 and the outer bag 105.

Further, the depression part 112 is formed of the circumferential side wall 113 and the bottom portion 114. By connecting the bottom portion 114 to the circumferential side wall 113, it is possible to ensure the shape of the depression part in a stable state by the circumferential side wall 113 and the bottom portion 114. Thereby, when the airbag bag body 102 is inflated and expanded, it is possible to enhance a shape stability of the airbag bag body 102.

In this way, by forming the depression part 112 on the outer lower part 108 (that is, the lower part 102a of the airbag bag body 102), and furthermore, by enhancing the shape stability of the airbag bag body 102, it is possible to favorably accommodate the upper part 18a of the obstacle 18 by the depression part 112. Thereby, it is possible to smoothly inflate and expand the airbag bag body 102.

Further, by accommodating the upper part 18a of the obstacle 18 by the depression part 112, when the airbag bag body 102 comes into contact with the obstacle 18, it is possible to absorb an impact that is given to the obstacle 18. Further, by accommodating the upper part 18a of the obstacle 18 by the depression part 112, it is possible to stabilize the shape of the airbag bag body 102 after inflation and expansion.

The bottom portion 114 of the depression part 112 is sewn to the inner lower part 107, for example, throughout the entire range of the circumferential edge. It is also possible to sew the bottom portion 114 of the depression part 112 to the inner lower part 107, for example, throughout the entire range of the circumferential edge at a predetermined interval.

By sewing the bottom portion 114 of the depression part 112 to the inner lower part 107, it is possible to stably maintain the depression part 112 on the inner lower part 107 (that is, the inner bag 104). Thereby, it is possible to further stabilize the shape of the airbag bag body 102 after inflation and expansion.

In this way, by smoothly inflating and expanding the airbag bag body 102, and furthermore, by stabilizing the shape of the airbag bag body 102 after inflation and expansion, it is possible to favorably restrain and protect the occupant by the airbag bag body 102.

The technical scope of the present invention is not limited to the embodiment described above, and a variety of changes can be added without departing from the scope of the invention.

For example, the above first and second embodiments are described using an example of the airbag apparatus 20 that is stored inside the instrument panel 12; however, the embodiment is not limited thereto. As other examples, for example, it is also possible to apply to other airbags such as a knee airbag apparatus that is stored in the instrument panel 12 and that protects the knee of the occupant and a side airbag apparatus that is stored in a roof rail and that is inflated and expanded at the side part of the vehicle room.

Further, the above first and second embodiments are described using an example in which the backrest part 18 of the baby seat 17 is the obstacle 18; however, the embodiment is not limited thereto. The obstacle 18 is not limited to the backrest part 18 of the baby seat 17.

Further, the above first embodiment is described using an example in which the depression part 81 is formed by overlapping the outer opening portion 71 and the inner recess portion 47 in the vertical direction; however, the embodiment is not limited thereto. As other examples, for example, it is also possible to sew and thereby connect the circumferential side wall of the outer opening portion 71 and the circumferential side wall 48 of the inner recess portion 47.

By connecting the circumferential side wall of the outer opening portion 71 and the circumferential side wall 48 of the inner recess portion 47, in a state where the airbag bag body 25 is inflated and expanded, it is possible to form the depression part 81 in a further stable state.

Further, the above second embodiment is described using an example in which the bottom portion 114 of the depression part 112 is sewn to the inner lower part 107; however, the embodiment is not limited thereto. As other examples, for example, the bottom portion 114 of the depression part 112 may not be sewn to the inner lower part 107.

What is claimed is:

1. An airbag apparatus that protects an occupant, the apparatus comprising:
    an airbag bag body that is inflated and expanded by a gas which is generated from an inflator,
    wherein the airbag bag body comprises:
        an inner bag that is inflated and expanded by the gas which is supplied from the inflator; and
        an outer bag that covers the inner bag and that communicates with the inner bag via a communication hole,
    the outer bag has a depression part that is formed such that the depression part is depressed toward an upward direction of a vehicle from a lower surface of the outer bag in a state of being supplied with the gas through the communication hole from the inner bag and being inflated and expanded, and
    the depression part is formed of a circumferential side wall and a bottom surface, and the bottom surface of the depression part is sewn to the inner bag.

2. The airbag apparatus according to claim 1, wherein in the state of being inflated and expanded, the recess part accommodates an obstacle that is attached to a seat cushion and that is arranged at a vehicle body rearward position of an instrument panel and in a vicinity of the instrument panel.

* * * * *